United States Patent [19]

Williams et al.

[11] Patent Number: 4,720,116
[45] Date of Patent: Jan. 19, 1988

[54] STORABLE STAIRWAY AND PLATFORM APPARATUS FOR RECREATIONAL VEHICLES

[76] Inventors: Michael G. Williams, Box 756, Sun Valley, Id. 83353; Jim R. Williams, 5705 E. Mountain Ave., Orange, Calif. 92667

[21] Appl. No.: 934,260
[22] Filed: Nov. 24, 1986
[51] Int. Cl.⁴ .............................................. B60R 3/02
[52] U.S. Cl. ...................................... 280/166; 182/96; 182/127; 296/162
[58] Field of Search .................... 280/163, 164 R, 166; 296/162; 108/152; 182/84, 95, 96, 127; 248/166

[56] References Cited

U.S. PATENT DOCUMENTS

| | | | |
|---|---|---|---|
| 2,760,238 | 8/1956 | Lane | 52/79.6 |
| 3,392,990 | 7/1968 | Wolf | 280/163 |
| 3,515,406 | 6/1970 | Endsley, Jr. | 280/166 |
| 3,608,951 | 9/1971 | Jackson | 296/162 |
| 3,708,198 | 1/1973 | Coons | 296/162 |
| 3,796,456 | 3/1974 | Bergeson et al. | 280/163 |
| 3,889,997 | 6/1975 | Schoneck | 280/166 |
| 3,912,298 | 10/1975 | Humphrey | 280/166 |
| 3,997,211 | 12/1976 | Groves | 280/163 |
| 4,188,057 | 2/1980 | Pauli | 296/162 |
| 4,623,160 | 11/1986 | Trudell | 280/166 |

Primary Examiner—David M. Mitchell
Assistant Examiner—Brian L. Johnson
Attorney, Agent, or Firm—Paul F. Horton

[57] ABSTRACT

Storable stairway and platform apparatus for recreational vehicles including a horizontal channel member mounted to the side or end of a vehicle beneath and extending to the side of the door, the channel member reciprocally receiving a pair of slider members; a platform pivotally engaging the slider members; and a stairway pivotally engaging the platform. The stairway is provided with a pair of opposing scissor linkages for folding the steps of the stairway into compact parallel abutment with one another and with the platform. The platform and stairway laterally slide away from the door and are pivotal into a vertical position for storage against the outside wall of the vehicle. The scissor linkages provide for unobstructed steps in addition to superior compact storage. Adjustable levelers are provided on each of the opposing scissor linkages to accommodate for uneven ground support. A novel bannister foldable and attachable to the side of the platform may also be provided.

9 Claims, 4 Drawing Figures

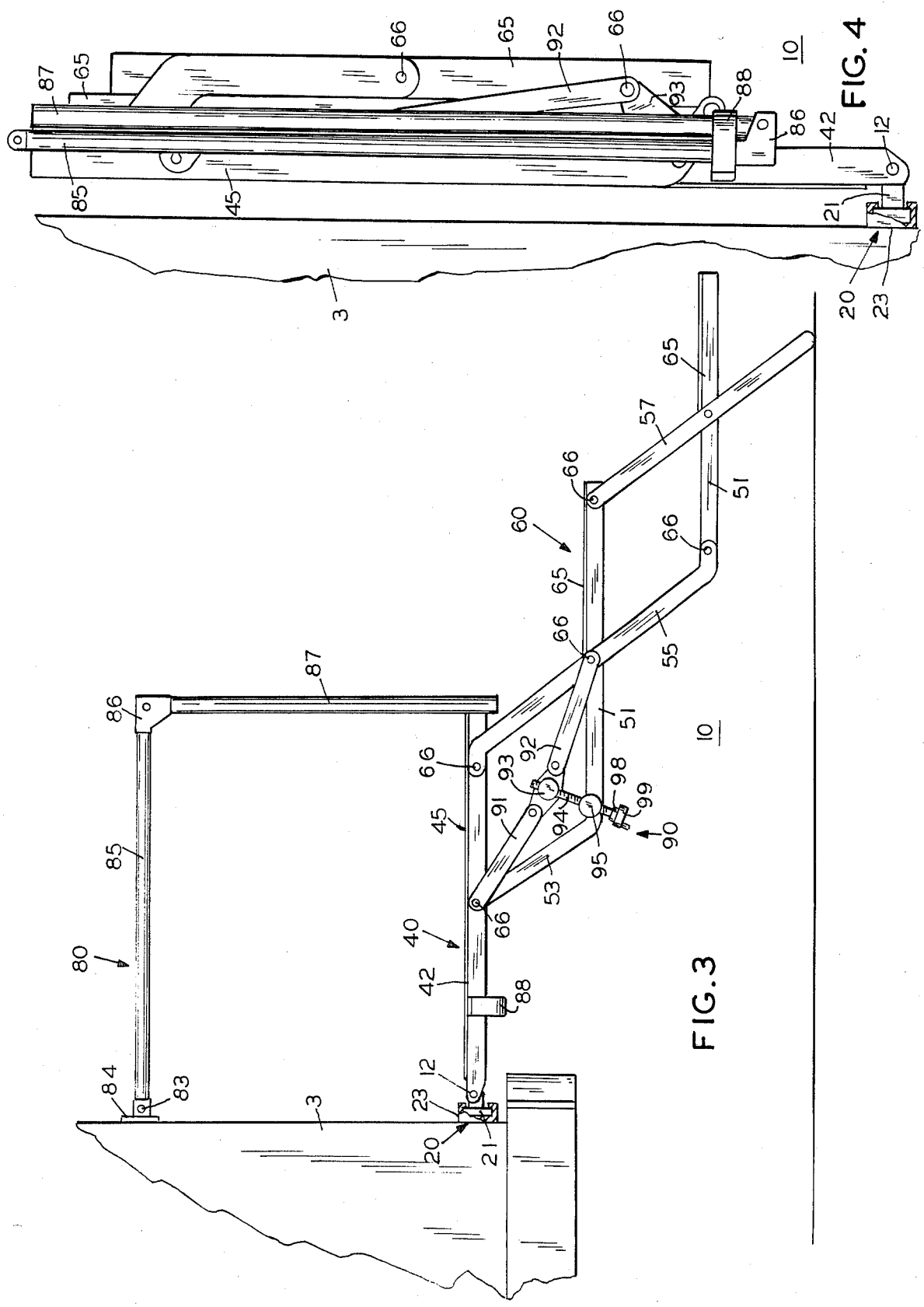

STORABLE STAIRWAY AND PLATFORM APPARATUS FOR RECREATIONAL VEHICLES

BACKGROUND OF THE INVENTION

1. Field of the Invention

This invention relates in general to stairways and in particular to storage type platforms and stairways for recreational type vehicles.

2. Description of the Prior Art

The desirability of having stairways for recreational vehicles which may be folded and stored against the wall of the vehicle has long been recognized. Such stairways should fold easily, store compactly, and have a design to insure the safety of the user.

Typical of such stairways in the current art is the device of C. D. Graves, U.S. Pat. No. 3,997,211 which includes a stairway and platform which is attachable to the wall of a recreational vehicle and which may be slid laterally from the doorway and folded for storage. The Graves device utilized parallel bar linkages for the steps; the top bars of which obstruct both sides of the steps at foot level resulting in a potentially dangerous obstacle which one may readily trip over if one should decide to laterally dismount the steps, even at ground level. The Graves device utilizes a pair of slotted guides to permit collapsing of the linkage, thus destroying the integrity of the system, particularly on uneven ground support; does not fold compactly against the vehicle, in having bannisters which increase the thickness of the stored apparatus; and the Graves device does not have means for properly supporting the stairway on uneven ground.

U.S. Pat. No. 3,796,456 issued to L. L. Bergeson, like Graves, utilizes parallel bars along the sides of the steps, thereby creating a potentially dangerous obstacle. The Bergeson apparatus retracts to a storage position below the vehicle and is therefore not useable on many vehicles. Bergeson also does not disclose any type of leveling means.

U.S. Pat. No. 3,392,990 issued to G. E. Wolf discloses a stairway which is slidable laterally to or from the doorway and may be pivoted upwardly for storage. The stairway of the Wolf device is not collapsible and is therefore bulky in the stored position. The Wolf device provides no platform nor does it provide means for leveling.

Other patents of interest but of lesser relevance are U.S. Pat. Nos. 2,760,238; 3,515,406; 3,608,951; 3,708,198; and 4,188,057.

SUMMARY OF THE INVENTION

The present invention overcomes the problems above stated in the prior art by providing a storable stairway and platform apparatus which includes a platform and a collapsible stairway which utilizes scissor linkage for unobstructed steps; which folds compactly for storage against the vehicle wall; which has leveling means for uneven ground support; and which may include a bannister foldable against the side of the platform to reduce thickness of the storage unit. A thorough description of the apparatus may be found in the appended claims.

BRIEF DESCRIPTION OF THE DRAWINGS

FIG. 3 is a side elevation of the apparatus shown in FIG. 2.

FIG. 4 is a side elevation of the device shown in FIG. 2 in the stored position.

DETAILED DESCRIPTION OF THE INVENTION

Figure 1:
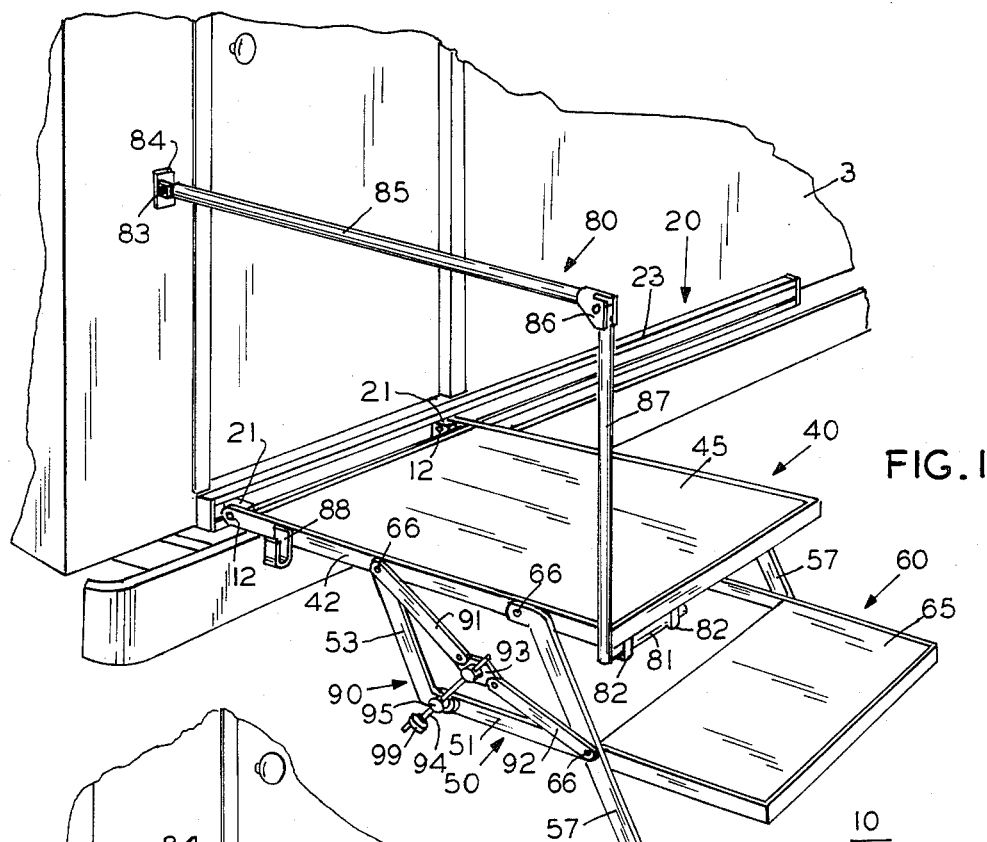
FIG. 1 is a perspective view of one preferred embodiment of the present invention showing use of a single step.

Referring now to the drawings and to FIG. 1 in particular, one embodiment to be preferred of the storable stairway and platform apparatus 10, made according to the present invention, is disclosed. Apparatus 10 includes, generally, mounting means designated by the numeral 20; platform means 40; stairway means 60; bannister means 80; and leveling means 90.

Mounting means 20 includes an aluminum channel member 23 affixed to the outside wall 3 of a recreational vehicle and a pair of aluminum slide members 21 received within the channel for reciprocal movement therein. The channel member extends horizontally across the wall 3 of the vehicle just below the door and at a sufficient distance for storage of the apparatus adjacent the door. Each of the slider members 21 is pivotally connected to framework 42 of platform means 40 by a pin 12 which extends through apertures in rearwardly extending lugs of the framework and which extends through apertures in the slider members; the apertures being in registry with one another.

Platform means 40 is of generally rectangular shape including an aluminum floor or platform 45 bounded by supporting framework 42. A non-skid covering may be applied to platform 45, or, in the alternative, the platform may be constructed of expanded metal grating. It is to be noted that the platform is laterally movable upon slider members 21 which slide within channel member 23 and is also vertically pivotal relative to the slider members on pins 12, for storage.

Stairway means 60 is pivotally connected to the sides of framework 42 of the platform and includes at least one step 65 joined to the platform by a pair of scissor linkages, each designated generally by the numeral 50, located on opposing sides of the step or steps. Each of the steps 65 may also be constructed of aluminum provided with a non-skid covering or, like the platform, may be constructed of expanded metal.

Each of the scissor linkages 50 include a stationary side bar 51 which is affixed to each step 65 and which extends rearward of the step and planar with the step; a first leg 53 pivotally connected to platform 45 and to side bar 51 of the underlying step, adjacent the rear end of the side bar; and a ground engaging leg 57 connected to the side bar of the lowermost step adjacent the rear of the step and to platform 45 or to an overlying step, as the case may be. All scissor linkage connections are pivotal as by pins 66, rivets, or the like. It is to be appreciated that such attachment between the legs and the side bars provides for unobstructed movement off any step in that there is no linkage structure which might trip the person using the steps.

Figure 2:
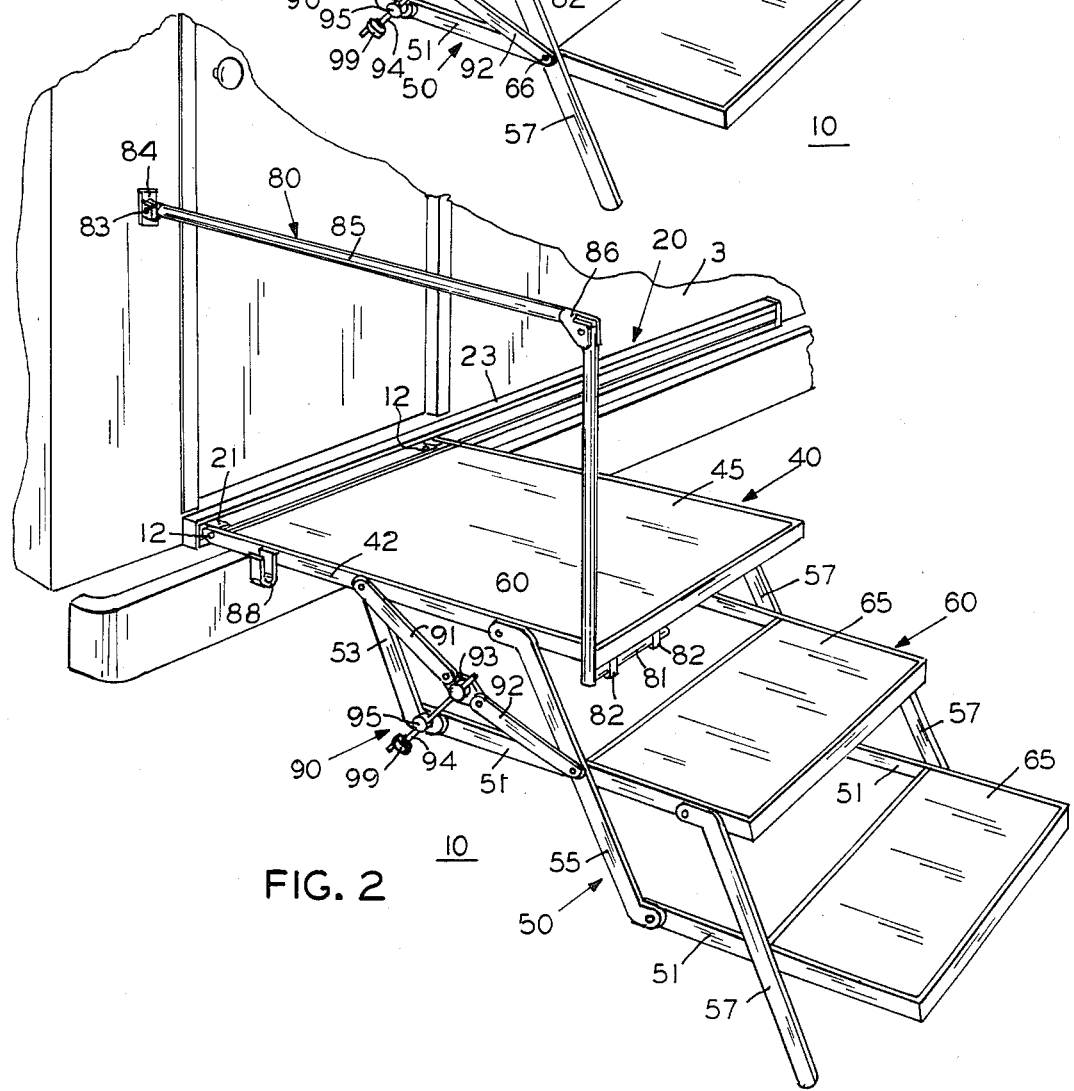
FIG. 2 is a perspective view of a second embodiment of the present invention showing two steps.

Referring now to FIGS. 2 and 3, a second embodiment of the invention may be seen. This embodiment is like the first embodiment shown in FIG. 1 in all respects, except that one or more additional steps are provided. In this embodiment each scissor linkage 50 is also provided with one or more middle legs, designated generally by the numeral 55. Each of the middle legs are pivotally connected to a side bar 51 of a step adjacent the rear of the step; to the side bar 51 of an underlying step at the rear of the side bar and to an overlying step or to platform 45 adjacent the forwardmost end thereof.

Leveling means, designated by the numeral 90, are connected within one or both of the scissor linkages 50 for retracting or extending the linkage for leveling the steps and platform relative to ground. Because of a slope on the pavement supporting the structure or because of unevenness of the earth below the ground engaging legs 57 of each linkage, the stairway and platform may be tilted unless a leveling means is used. In the preferred embodiment, each leveling means or levelers 90 include a first brace 91, a second brace 92, a pivot flange 93, a threaded crank 94, and a crank sleeve 95. The leveling means is preferably connected at the uppermost end of each scissor linkage with the first brace 91 pivotally engaging platform 45 at the joinder of first leg 53 and flange 93; the second brace 92 pivotally engaging underlying step 65 at its joinder with ground engaging leg 57 or middle leg 55, as the case may be, and the pivot flange. Crank 94 is threadably received within pivot flange 93 and reciprocally slides within crank sleeve 95 which is affixed to side bar 51 at the joinder of first leg 53. The crank is provided with a knob 99 having an abutment shoulder 98 for engaging the sleeve for support. As knob 99 is rotated, crank 94, in its engagement with the sleeve 95 and pivot flange 93, pulls downward on braces 91 and 92 to pull platform 45 and steps 65 closer together, effectively shortening the scissor linkage to level the steps and platform. A reverse rotation of the crank effectively lengthens the linkage.

Bannister means 80 comprises a horizontal rail 85 and a vertical rail 87 which are pivotal with one another by means of hinge 86. Rail 85 is pivotally and temporarily affixed to rail support 84 by means of pin 83, which may be in the form of a bolt and nut assembly for ready removal. Vertical rail 87 is pivotally attached to the underside of platform 45 by a roll pin 81 received within a pair of laterally spaced supporting brackets 82.

For storage, and assuming the embodiment shown in FIGS. 2 and 3 is in use and in the open, operational position shown, pin 83 is first removed from rail support 84 and horizontal rail 85 is folded in parallel engagement with vertical rail 87. The pair of rails is then rotated on roll pin 81 to a position at the side of and in parallel alignment with platform 45 where they may be attached by means of spring clamp 88 or other conventional fastening means. The forward end of the lowermost step 65 is then grasped and raised to collapse scissor linkages 50 to bring the steps and platform into parallel, abutting engagement as shown in FIG. 4. In lifting the steps and platform, the platform pivots on pins 12 to a vertical position. Steps and platform are then slid laterally in channel member 23, by means of slide members 21, to a position beside or remote from the door, where they are secured for storage by a chain, strap, or other conventional securing means, not shown.

Having thus described in detail a preferred selection of embodiments of the present invention, it is to be appreciated and will be apparent to those skilled in the art that many physical changes could be made in the apparatus without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

We claim:

1. Storable stairway and platform apparatus for recreational vehicles comprising:

horizontally extending mounting means affixed to the vehicle;

platform means laterally movable on said mounting means and pivotally engagable therewith for vertical movement relative thereto;

stairway means pivotally connected to the sides of said platform means to engage the ground for supporting said apparatus, said stairway means including at least one step joined to said platform means by a pair of opposing scissor linkages for folding each of said steps into compact parallel abutment with one another and with said platform means; and leveling means connected to at least one of said opposing scissor linkages for retracting or extending said linkage for leveling of the apparatus relative to ground.

2. Storable stairway and platform apparatus for recreational vehicles comprising:

horizontally extending mounting means affixed to the vehicle;

platform means laterally movable on said mounting means and pivotally engagable therewith for vertical movement relative thereto, said platform means provided with a side mounted fastener;

stairway means pivotally connected to the sides of said platform means to engage the ground for supporting said apparatus, said stairway means including at least one step joined to said platform means by pair of opposing scissor linkages for folding each of said steps into compact parallel abutment with one another and with said platform means; and a collapsible bannister, said bannister including a horizontal rail pivotally connected to the vehicle by a pivot pin and a vertical rail pivotally connected to said horizontal rail and to said platform means; said horizontal rail detachable from said vehicle by removal of said pivot pin and foldable with said vertical rail for compact, temporary attachment to said fastener parallel to and in abutment with the side of said platform means.

3. Storable stairway and platform apparatus for recreational vehicles comprising:

horizontally extending mounting means affixed to the vehicle;

platform means laterally movable on said mounting means and pivotally engagable therewith for vertical movement relative thereto; and stairway means pivotally connected to the sides of said platform means to engage the ground for supporting said apparatus, said stairway means including at least one step joined to said platform means by a pair of opposing scissor linkages for folding each of said steps into compact parallel abutment with one another and with said platform means; and wherein each of said scissor linkages of said stairway means including a stationary side bar affixed to, planar with, and extending rearward of each step; a first leg, pivotally connected to said platform means and pivotally connected to the stationary side bar of a step underlying said platform means adjacent the rearmost terminal end of said side bar; and a leg having a lower end engaging the ground and pivotally connected at a point spaced from its lower end to the stationary side bar of the lowermost step adjacent the rear of said step, and to the stationary side bar of an overlying step or to said platform means adjacent the forwardmost end of said step or platform means.

4. The apparatus as described in claim 3 further comprising levelers connected to each of said scissor linkages, each of said levelers including a first brace, a second brace, a pivot flange, a threaded crank, and a crank sleeve, each of said braces pivotally connected to said pivot flange; said first brace pivotally engaging said platform means at the joinder of said first leg; said second brace pivotally engaging said underlying step at the joinder of said ground engaging leg; said crank sleeve affixed to said stationary side bar at the joinder of said first leg and said threaded crank slidably received within and in abutting engagement with said sleeve and threadably engaging said pivot flange for shortening and lengthening a respective scissor linkage upon rotation of said crank.

5. The apparatus as described in claim 3 wherein each of said scissor linkages of said stairway means includes one or more middle legs, each of said middle legs pivotally connected to the side bar of a step adjacent the rear of the step; to the stationary side bar of an underlying step adjacent the rearward most end of said side bar; and to the side bar of an overlying step or to said platform means adjacent the forwardmost end thereof.

6. Storable stairway and platform apparatus for recreational vehicles comprising:

horizontally extending mounting means affixed to the vehicle;

platform means laterally movable on said mounting means and pivotally engagable therewith for vertical movement relative thereto;

stairway means pivotally connected to the sides of said platform means to engage the ground for supporting said apparatus, said stairway means including a plurality of steps pivotally joined together and to said platform means by a pair of opposing scissor linkages for folding each of said steps into compact parallel abutment with one another and with said platform means, each of said scissor linkages including a stationary side bar affixed to, planar with, and extending rearward of each step; a first leg pivotally connected to said platform means and pivotally connected to the stationary side bar of a step underlying said platform means adjacent the rearmost terminal end of said side bar; one or more middle legs, each of said middle legs pivotally connected to the side bar of a step adjacent the rear of the step, to the stationary side bar of an underlying step adjacent the rearward most end of said side bar, and to the side bar of an overlying step or to said platform means, adjacent the forwardmost end thereof; and a leg having a lower end engaging the ground and pivotally connected at a point spaced from its lower end to the stationary side bar of the lowermost step adjacent the rear of said step, and to the stationary side bar of an overlying step adjacent the forwardmost end of said step to define a stairway having unobstructed steps; and leveling means connected to each of said opposing scissor linkages for retracting or extending said linkage for leveling of the apparatus relative to ground.

7. The apparatus as described in claim 6 wherein said leveling means includes a leveler connected to each of said scissor linkages, each of said levelers including a first brace, a second brace, a pivot flange, a threaded crank, and a crank sleeve, each of said braces pivotally connected to said pivot flange; said first brace pivotally engaging said platform means at the joinder of said first leg; said second brace pivotally engaging said underlying step at the joinder of one of said middle legs; said crank sleeve affixed to said stationary side bar at the joinder of said first leg, and said threaded crank slidably received within and in abutting engagement with said sleeve and threadably engaging said pivot flange for shortening and lengthening a respective scissor linkage upon rotation of said crank.

8. The apparatus as described in claim 6 wherein said platform means is provided with a side mounted fastener and further comprising bannister means connected to said vehicle and said platform means, said bannister means operable to fold in parallel abutting engagement with said platform means for attachment thereto by means of said fastener.

9. The apparatus as described in claim 8 wherein said bannister means includes at least one bannister, each of said bannisters including a horizontal rail pivotally connected to the vehicle by a pivot pin and a vertical rail pivotally connected to said horizontal rail and to said platform means; said horizontal rail detachable from said vehicle by removal of said pivot pin and foldable with said vertical rail for compact, temporary attachment parallel to and in abutment with the side of said platform means by means of said fastener.

* * * * *